(No Model.)
H. J. GILBERT.
FRICTION CLUTCH.
No. 421,694.
2 Sheets—Sheet 2.
Patented Feb. 18, 1890.
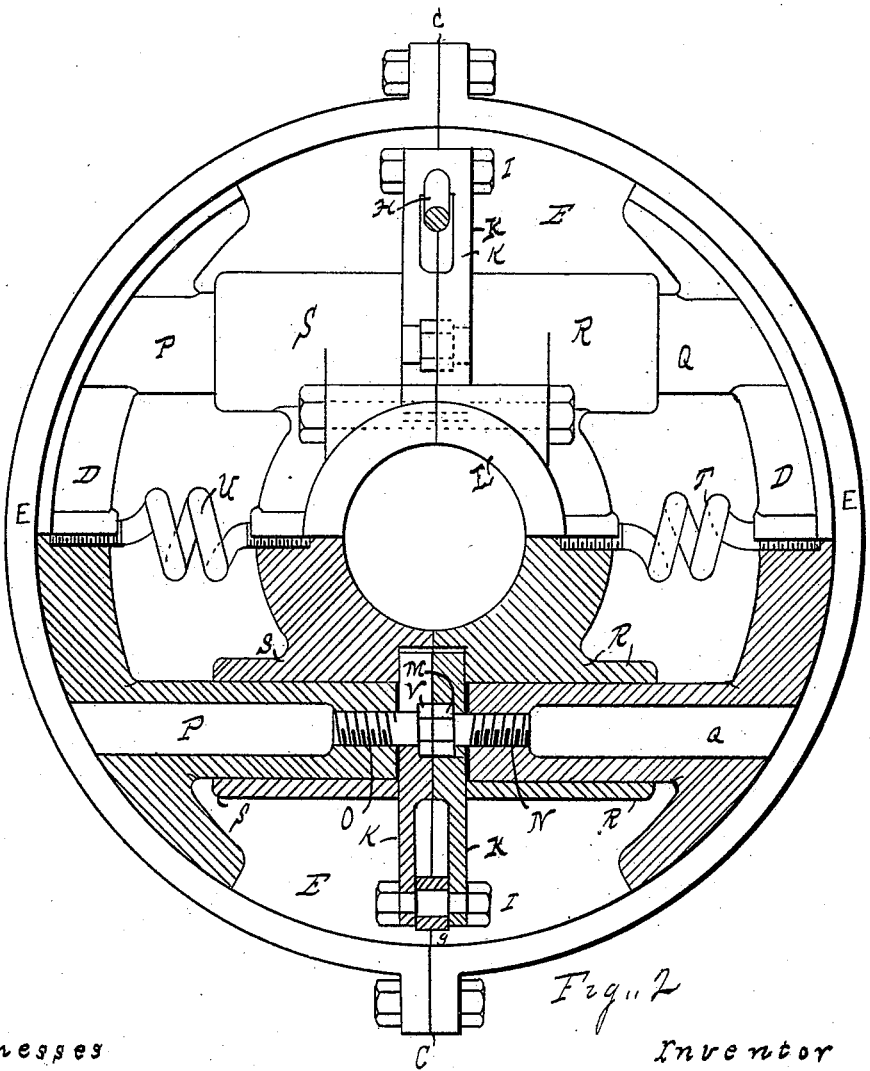
Witnesses
Henry R Lothrop
Gertrude Anderson.
Inventor
Henry J. Gilbert
by Geo. H. Lothrop
atty

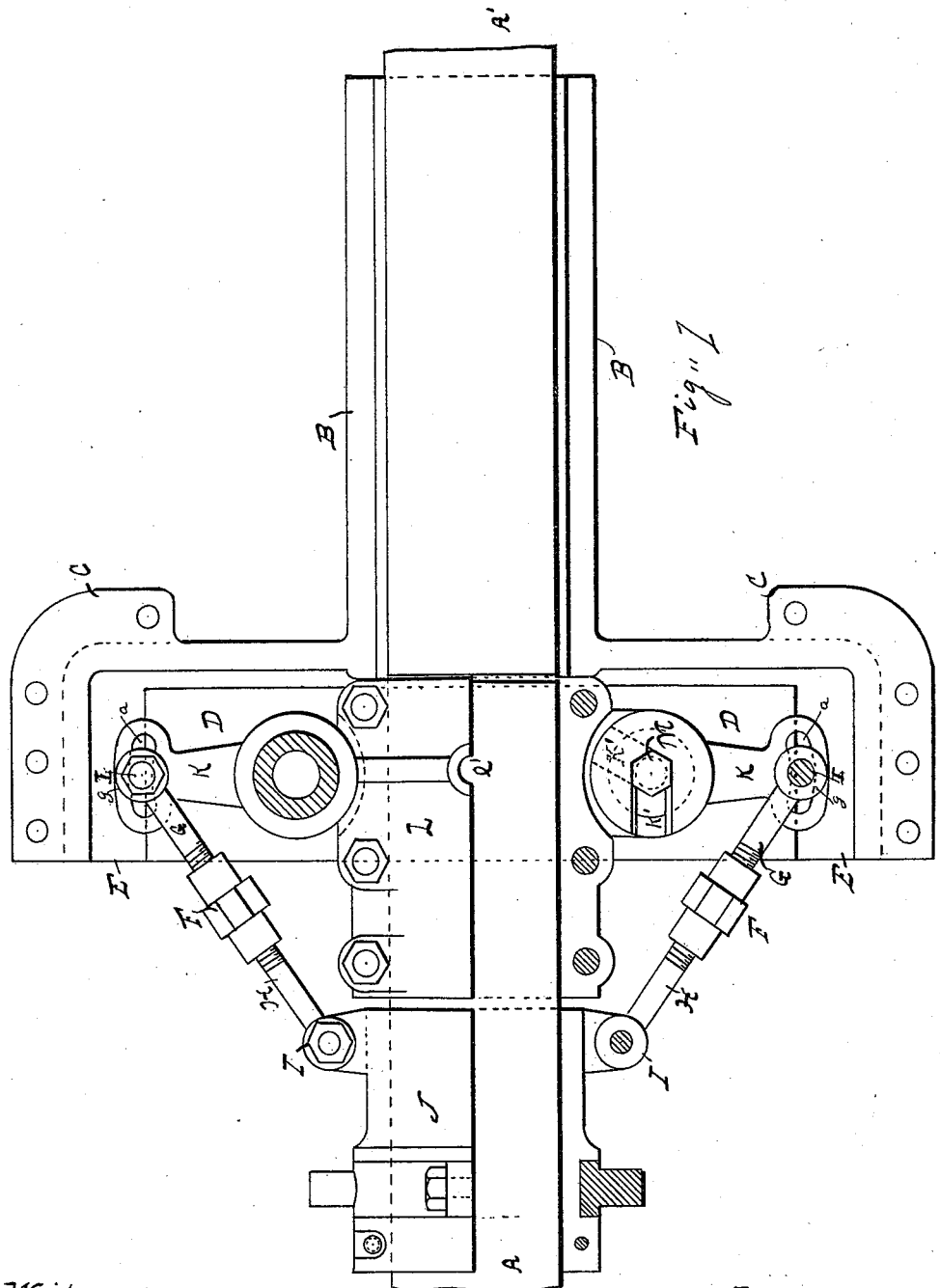

UNITED STATES PATENT OFFICE.

HENRY J. GILBERT, OF SAGINAW, MICHIGAN.

FRICTION-CLUTCH.

SPECIFICATION forming part of Letters Patent No. 421,694, dated February 18, 1890.

Application filed September 19, 1889. Serial No. 324,389. (No model.)

*To all whom it may concern:*

Be it known that I, HENRY J. GILBERT, of Saginaw, in the county of Saginaw and State of Michigan, have invented a new and useful Improvement in Friction-Clutches, of which the following is a specification.

My invention consists in an improved friction-clutch, hereinafter fully shown end described.

Figure 1 is a side elevation, partly in section; Fig. 2, an end elevation, also partly in section; and Fig. 3, an enlarged section through the post and spreading-bolts.

The device is shown in Fig. 1 as applied to coupling together two shafts A and A'.

B represents a sleeve rigidly secured to the shaft A' and carrying a pulley E. The sleeve B and the pulley E may be made in two parts, with flanges C, by which the same are bolted together.

D D represent two curved friction-plates, each of which is provided with two hollow posts P P and Q Q, which slide in sleeves S and R, formed on a collar L, which is rigidly bolted to the shaft A. The posts P and Q are internally screw-threaded, one (as for example P) having a right-hand screw-thread and the other having a left-hand screw-thread.

O and N represent screw-bolts adapted to engage with the screw-threads in posts P and Q, each having a head (represented by V and M) to engage with a wrench, whereby said bolts may be turned.

In friction-clutches in which the plates are spread or drawn together by right-and-left-hand-screw-threaded bolts it has been customary to put both threads on one bolt, and this renders it somewhat difficult to put the clutch together and properly adjust the two friction-plates, and is very troublesome when it is required to take out and remove one of plates or bolts. These difficulties are obviated by using two bolts and working both bolts of each pair by a single lever or wrench which takes both heads.

K K represent two levers or wrenches adapted to engage with the heads V and M of the two pairs of screw-bolts O and N, and of each of these wrenches I make two arms, as shown in Fig. 2, secured together by a bolt I, and I put the slots K', by which the wrenches are slipped over the heads of the screw-bolts, at right angles to each other in the two arms of each wrench, whereby said arms mutually retain each other in place in engagement with the heads of the screw-bolts.

G and H represent connecting-rods joined together by a threaded nut F, for the purpose of adjusting the length of said rods, by which the outer ends of wrenches or levers K K are connected with a sliding sleeve J on shaft A, the sleeve J being movable on said shaft A by any of the well-known forms of lever used for such purposes. It is evident that when the sleeve J is moved in one direction the connecting-rods G and H will push the free ends of levers or wrenches K, so as to rotate the screw-bolts O and N in one direction, and when moved in an opposite direction will cause said rods G H to pull said levers or wrenches K and to rotate the screw-bolts O and N in the other direction, thus forcing the friction-plates D D against the pulley E or withdrawing them therefrom. I provide a further adjustment by slotting the outer ends of the levers or wrenches K, as shown at *a*, and connecting the rod G therewith by means of an eye *g* and the bolt I, whereby the wrenches or levers K may be independently adjusted. It sometimes happens in clutches of this kind that when the clutch is thrown off and the shaft A is the one which rotates the centrifugal force of the plates D D is sufficient to cause the screw-bolts to turn and thus draw the clutch into engagement with the pulley. To prevent this I connect the collar L with the plates D D by springs U and T, which may be of any desired form and fastened to said collar and plates in any convenient way. The springs resist the centrifugal force of plates D D and prevent their coming into engagement with pulley E.

What I claim as my invention, and desire to secure by Letters Patent, is—

1. In a friction-clutch, the combination of two friction-plates, each connected with a central collar by two internally-screw-threaded posts, the screw-threads in the opposite posts being, respectively, right and left hand, two pairs of screw-bolts adapted to engage with the opposite posts, and two wrenches, each engaging with both heads of one pair of screw-bolts, substantially as shown and described.

2. In a friction-clutch, the combination, with the screw-bolts O and N, of the wrench K, having the slots K' at different angles to engage the heads of said screw-bolts, substantially as shown and described.

3. The combination, in a friction-clutch, of the wrench K, having the slot $a$ therein, with the connecting-rod G and bolt I, substantially as and for the purposes set forth.

4. In a friction-clutch, the combination of the plates D D, carrying screw-threaded posts P P and Q Q, with collar L, having sleeves S and R, and pairs of screw-bolts O and N, substantially as shown and described.

5. In a friction-clutch, the combination, with the collar L, having sleeves S R, of the friction-plates D D, provided with screw-threaded posts P Q, the screw-bolts O N, the springs U T, and the wrenches K K, substantially as described.

HENRY J. GILBERT.

Witnesses:
 BURTON HANSHETT,
 EZRA RUST.